US012102853B2

(12) United States Patent
Goodman

(10) Patent No.: US 12,102,853 B2
(45) Date of Patent: Oct. 1, 2024

(54) PERSONAL PROTECTED-AIR SYSTEM

(71) Applicant: Kathy E. Goodman DO, Inc., Delray Beach, FL (US)

(72) Inventor: Kathy E. Goodman, Delray Beach, FL (US)

(73) Assignee: KATHY E. GOODMAN DO, INC., Delray Beach, FL (US)

( * ) Notice: Subject to any disclaimer, the term of this patent is extended or adjusted under 35 U.S.C. 154(b) by 578 days.

(21) Appl. No.: 17/488,390

(22) Filed: Sep. 29, 2021

(65) Prior Publication Data

US 2022/0096875 A1 Mar. 31, 2022

Related U.S. Application Data

(60) Provisional application No. 63/085,176, filed on Sep. 30, 2020.

(51) Int. Cl.

| | |
|---|---|
| ***A62B 7/12*** | (2006.01) |
| ***A62B 9/02*** | (2006.01) |
| ***A62B 18/04*** | (2006.01) |
| ***A62B 18/08*** | (2006.01) |
| ***A62B 18/10*** | (2006.01) |

(52) U.S. Cl.

CPC .................. *A62B 7/12* (2013.01); *A62B 9/02* (2013.01); *A62B 18/04* (2013.01); *A62B 18/086* (2013.01); *A62B 18/10* (2013.01)

(58) Field of Classification Search

CPC ....... A62B 18/003; A62B 18/00; A62B 18/04; A62B 18/086; A62B 17/04; A62B 7/12; A62B 9/02; A41D 13/11; A41D 13/1184; A62D 7/00; A42B 3/22; A61F 9/068; A61L 2209/134

See application file for complete search history.

(56) References Cited

U.S. PATENT DOCUMENTS

| | | | | | |
|---|---|---|---|---|---|
| 3,067,425 | A * | 12/1962 | Colley | A62B 18/086 | 137/614.19 |
| 3,921,223 | A * | 11/1975 | Hoyecki | A61F 9/068 | 2/9 |
| 4,683,880 | A * | 8/1987 | Werjefelt | A62B 15/00 | 128/201.28 |
| 5,056,512 | A * | 10/1991 | Bower | A62B 17/04 | 128/205.28 |
| 5,878,742 | A * | 3/1999 | Figueredo | A62B 18/003 | 128/201.24 |
| 7,597,101 | B2 * | 10/2009 | Burnett | A62B 18/003 | 128/204.18 |

(Continued)

*Primary Examiner* — Samchuan C Yao
*Assistant Examiner* — Mishal Zahra Hussain
(74) *Attorney, Agent, or Firm* — Peter J. Van Bergen

(57) ABSTRACT

A personal protected-air system includes first and second rings, and a sleeve coupled on each end thereof to one of the rings. The first ring includes a port for receiving filtered air under pressure, a manifold in fluid communication with the port, and vents in fluid communication with the manifold and the interior region of the sleeve. The sleeve includes a transparent region. In use, the second ring fits over a user's head, the sleeve encases the user's head, and the first ring rests on a top portion of the user's head. The second ring includes an air passage providing fluid communication between an ambient environment and the interior region of the sleeve.

7 Claims, 7 Drawing Sheets

(56) References Cited

U.S. PATENT DOCUMENTS

| | | | | |
|---|---|---|---|---|
| 2004/0216736 | A1* | 11/2004 | Lee | A62B 17/04 128/201.22 |
| 2011/0226240 | A1* | 9/2011 | Navalesi | A61M 16/06 128/201.23 |
| 2017/0361133 | A1* | 12/2017 | Yu | F04D 19/007 |
| 2020/0376305 | A1* | 12/2020 | Lang | A62B 9/02 |
| 2021/0290989 | A1* | 9/2021 | Hall | A62B 17/003 |
| 2022/0072340 | A1* | 3/2022 | Nitta | A62B 7/10 |

* cited by examiner

PERSONAL PROTECTED-AIR SYSTEM

Pursuant to 35 U.S.C. § 119, the benefit of priority from provisional application 63/085,176, with a filing date of Sep. 30, 2020, is claimed for this non-provisional application.

FIELD OF THE INVENTION

The invention relates generally to breathing air protection systems, and more particularly to a protected-air system for an individual traveling in a vehicle/aircraft having an enclosed cabin and/or ambulating in environments having the potential for the presence of large amounts of airborne infectious pathogens.

BACKGROUND OF THE INVENTION

In 2020, the outbreak of the COVID-19 virus alerted the world to the potentially deadly nature of airborne infectious pathogens. When such airborne infectious pathogens are readily transmitted by humans via their aerosolized particles expelled during breathing, speech, singing, coughing, sneezing, etc., anyone in the proximity of the aerosolized particles can be infected. The risk of infection is greatly increased when people share an enclosed "cabin" space such as those defined by aircraft, land vehicles, and enclosed rooms. Infection risk is also increased when people must ambulate in crowded and potentially pathogen-rich environments such as airports, train stations, bus depots, indoor arenas, etc.

Currently, when in any environment that presents a high risk of infection, medical and science experts advise people to wear a face mask that covers one's nose and mouth. While face masks are effective at greatly reducing airborne pathogen transmission, they can make breathing more difficult and can be uncomfortable when worn for extended periods. In addition, the air one breathes when wearing a mask never feels like "fresh air". Thus, the drawbacks of mask wearing frequently lead to incorrect wearing of masks and/or their premature removal, both of which negate the advantages of wearing a mask.

SUMMARY OF THE INVENTION

Accordingly, it is an object of the present invention to provide a personal protected-air system.

Another object of the present invention is to provide a personal system that can provide a user with a continuous supply of fresh and filtered air in order to protect a user from airborne infectious pathogens that may be present in an ambient air environment.

Still another object of the present invention is to provide a personal protected-air system that avoids the drawbacks of traditional face masks.

Yet another object of the present invention is to provide a personal protected-air system for use during vehicle or air travel as well as ambulating movement in airports, stations, or depots.

Other objects and advantages of the present invention will become more obvious hereinafter in the specification and drawings.

In accordance with the present invention, a personal protected-air system includes a first ring adapted to rest on and circumscribe a top region of a user's head. The first ring includes a port accessible from a first external region of the first ring that is adapted to receive filtered air under pressure. The first ring also includes a manifold in fluid communication with the port and a plurality of vents in fluid communication with the manifold and a second external region of the first ring. The vents are distributed about a portion of the first ring wherein the filtered air under pressure received at the port exits the first ring through the vents. An open-ended sleeve having a first open end and a second open end is coupled to the first ring at its first open end wherein the second external region of the first ring is disposed within an interior region of the sleeve. The sleeve includes a transparent region. A second ring is coupled to the second open end of the sleeve and is adapted to fit over the user's head. The second ring includes an air passage providing fluid communication between an ambient environment and the interior region of the sleeve.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
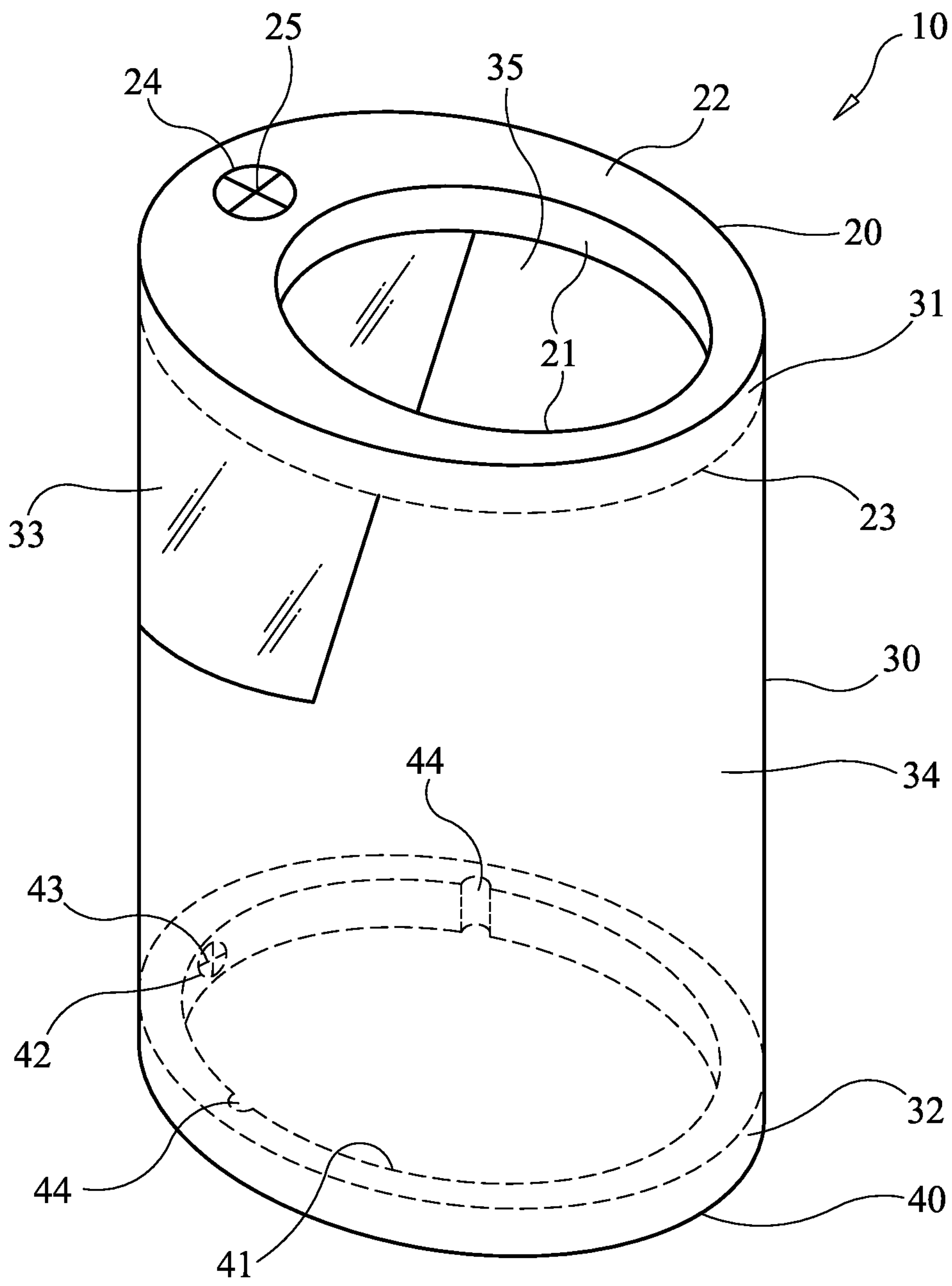
FIG. 1 is a perspective view of a personal protected-air system in accordance with an embodiment of the present invention.
Figure 2:
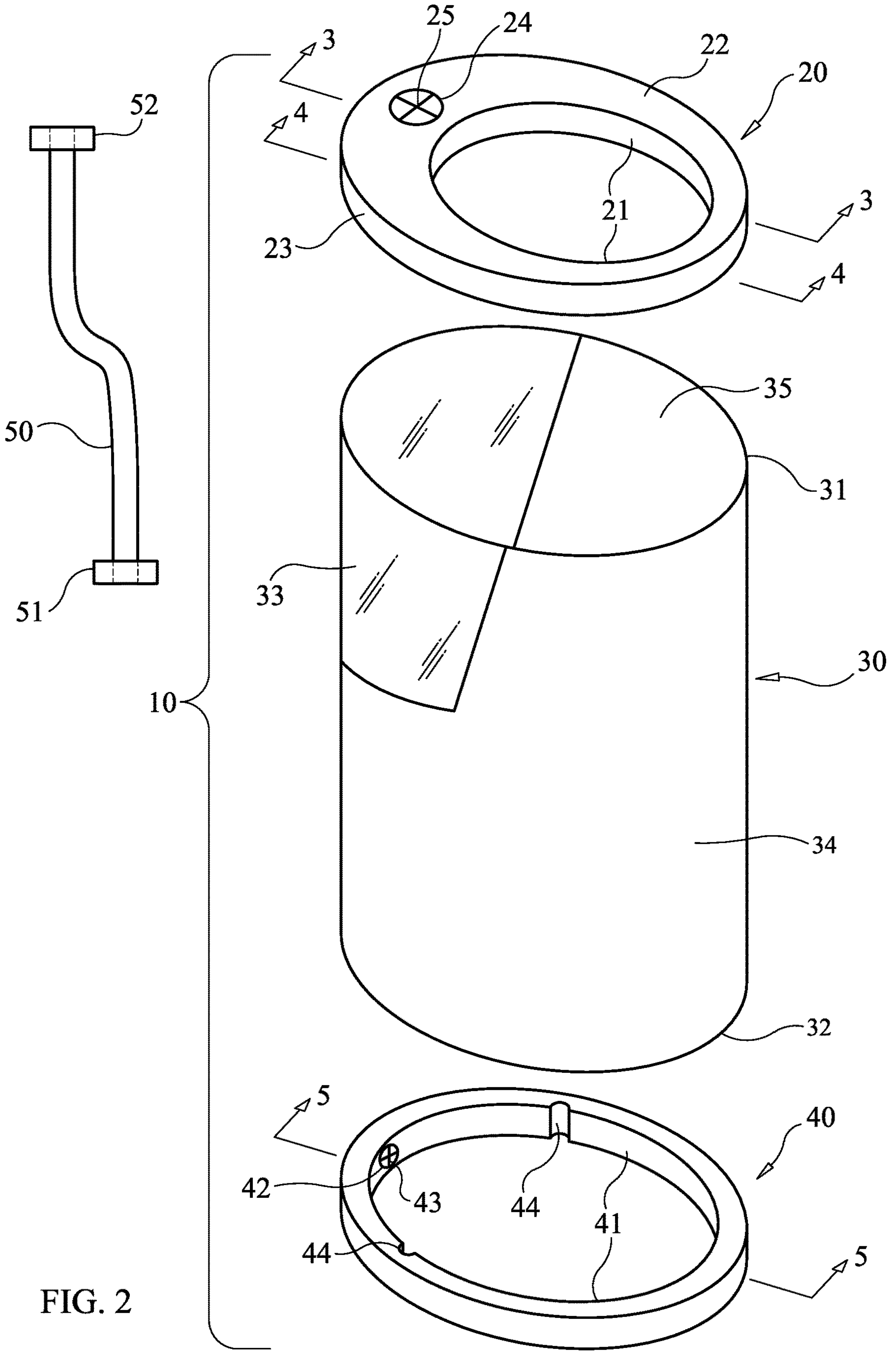
FIG. 2 is an exploded perspective view of the personal protected air system illustrated in FIG. 1 and further including a conduit for use in coupling the system to an aircraft's filtered-air nozzle in accordance with an embodiment of the present invention.

Referring now to the drawings, simultaneous reference will be made to FIGS. 1 and 2 where a personal protected-air system in accordance with an embodiment of the present invention is shown and is referenced generally by numeral 10. FIG. 1 is a perspective view of protected-air system 10 in its assembled form, and FIG. 2 is an exploded view of protected-air system 10. As will be explained further below, system 10 is sized and shaped to fit over and rest on a user's head to define an air space there about that can be supplied with (breathable) air under pressure. The air under pressure can originate from a filtered-air source (e.g., a filtered-air nozzle located above one's seat on an aircraft, a portable filtered-air supply, etc.), or can originate from a fresh/outdoor air source without departing from the scope of the present invention. In some embodiments of the present invention, a flexible open-ended conduit or hose 50 (FIG. 2) can be provided to couple a filtered-air source (not shown) to system 10 as will be described further below.

Protected-air system 10 includes a top ring 20, an open-ended sleeve 30, and a bottom ring 40. When worn by a user, top ring 20 rests on the user's head, sleeve 30 encases substantially all of the user's head, and bottom ring 40 encircles the user's neck. A variety of materials can be used for each of top ring 20, sleeve 30, and bottom ring 40 without departing from the scope of the present invention. Material choices and construction details for system 10 can be based on an application's design criteria such as the environment of use, cost, durability, weight, bio-degradability, etc.

Figure 3:
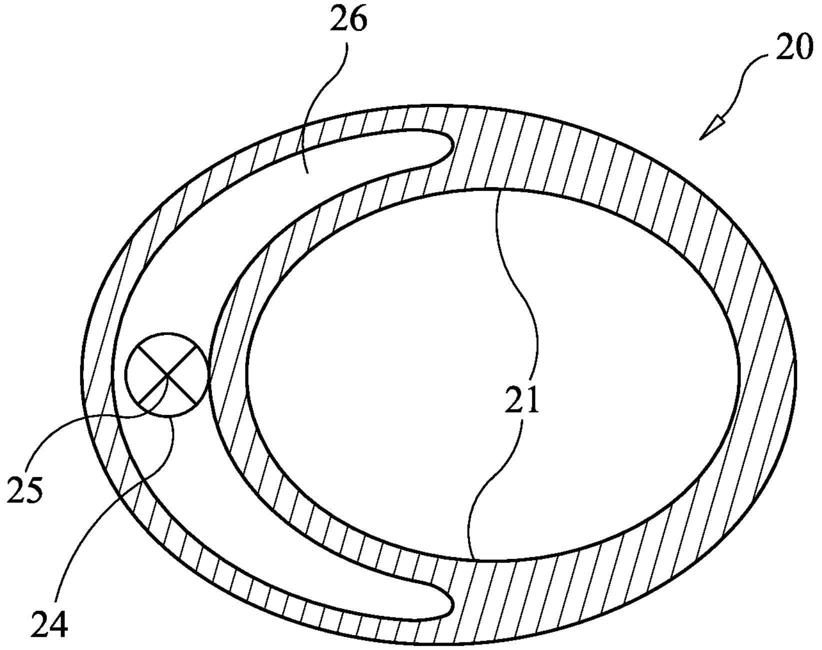
FIG. 3 is a cross-sectional view of the system's top ring taken along line 3-3 in FIG. 2.
Figure 4:
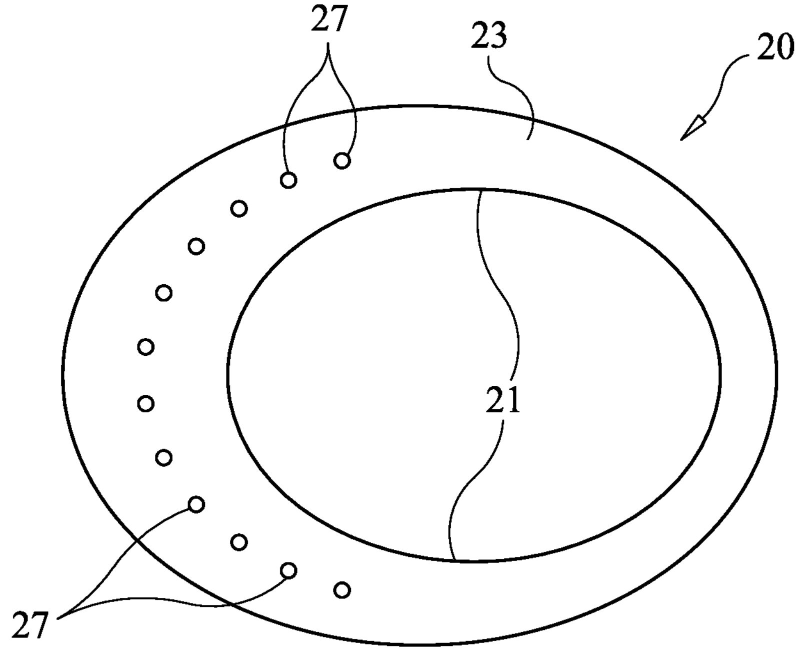
FIG. 4 is a bottom plan view of the system's top ring taken along line 4-4 in FIG. 2.

Details of top ring 20 will now be explained with additional reference to FIGS. 3 and 4 where a cross-sectional view of top ring 20 is illustrated in FIG. 3 and a bottom plan view of top ring 20 is illustrated in FIG. 4. Top ring 20 has a central opening 21 sized and shaped to rest on and circumscribe a top region of a user's head. In other words, top ring 20 is configured as an open-top crown-like ring with its central opening 21 engaging a top region of the user's head. For example, central opening 21 can be realized by a flexible or pliable material band that readily conforms to the size/shape of the top region of a user's head similar to the way a cap or hat conforms to one's head such that an air tight or substantially air tight seal is formed with the user's head.

When system 10 is worn on the head the head of a user, top ring 20 has an external top surface 22 and an external bottom surface 23. Top surface 22 is accessible from the outside of system 10 and bottom surface 23 is disposed within the interior region of sleeve 30. A port 24 is provided in top surface 22. Port 24 can be configured in a variety of ways without departing from the scope of the present invention. In some embodiments of the present invention, port 24 can be configured with quick-connect features that allow it to be readily attached/detached from one end 51 of conduit 50. The other end 52 of conduit 50 can be configured for a quick connect/disconnect to/from an aircraft's filtered-air nozzle typically found over each passenger seat of an aircraft. Such quick-connect features can utilize one or more of magnetic couplings, mechanical couplings, elasticized couplings, etc., without departing from the scope of the present invention. A check valve 25 can be disposed in port 24 to assure that fluid flow can only enter port 24 at top surface 22, but not exit therefrom.

Contained within top ring 20 is a manifold 26 that is in fluid communication with port 24 as best seen in FIG. 3. Briefly and in accordance with the accepted definition of a manifold, manifold 26 defines a chamber that is accessible via several openings. More specifically, air can be introduced into manifold 26 through check valve 25, but no air can exit manifold 26 via check valve 25. Instead, air entering manifold 26 through check valve 25 can only exit manifold 26 through a plurality of vents 27 formed in bottom surface 23 (FIG. 4) that are in fluid communication with manifold 26. When system 10 is resting on a user's head with port 24 at/near the front of the user's head, vents 27 are distributed about the front and sides of the user's head. Accordingly, when system 10 is worn by a user in this fashion and is coupled at port 24 by conduit 50 to an aircraft's filtered-air nozzle, filtered air under pressure is admitted into manifold 26 and exits top ring 20 via vents 27.

Sleeve 30 includes open ends 31 and 32 where open end 31 circumscribes and is coupled to top ring 20, and open end 32 circumscribes and is coupled to bottom ring 40. Ends 31 and 32 can be permanently or removably coupled to top ring 20 and bottom ring 40, respectively. Removable coupling can be achieved in a variety of ways (e.g., elastic, hook-and-loop fasteners, magnetic fasteners, snaps, zippers, etc.) without departing from the scope of the present invention. In some embodiments, sleeve 30 can be made from flexible and air-impermeable materials. In other embodiments, at least some of sleeve 30 can be made from air permeable materials to facilitate removal of one's exhalations from the interior region of sleeve 30. Sleeve 30 includes a transparent region 33 to provide visibility for a user wearing system 10. The remainder 34 of sleeve 30 can be opaque, translucent, or transparent without departing from the scope of the present invention. When system 10 is assembled, an interior region 35 of sleeve 30 between open ends 31/32 is bounded by top ring 20 and bottom ring 40.

Figure 5:
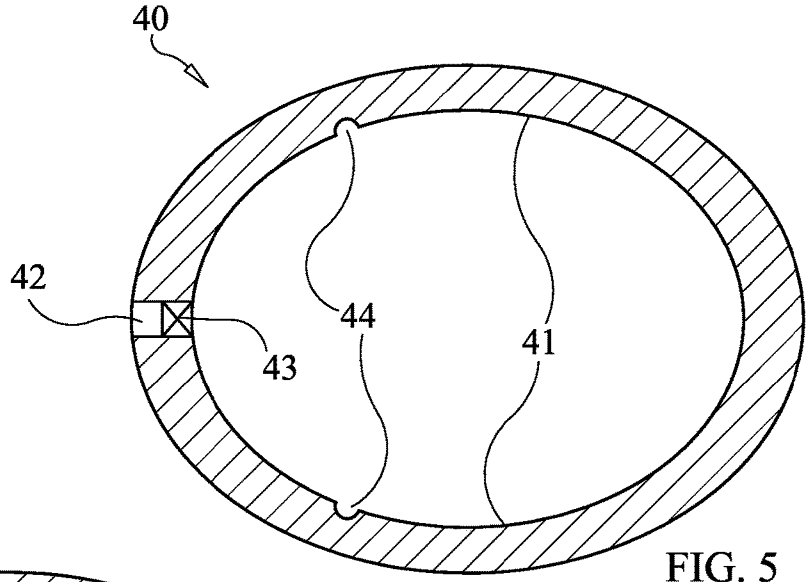
FIG. 5 is a cross-sectional view of the system's bottom ring taken along line 5-5 in FIG. 2.

Details of bottom ring 40 will now be explained with additional reference to FIG. 5 where a cross-section of bottom ring 40 is illustrated. Bottom ring 40 has a central opening 41 sized and shaped to readily fit easily over the entirety of a user's head. In some embodiments of the present invention, bottom ring 40 is configured to flex for purposes of being pulled over one's head. The combination of top ring 20 and sleeve 30 positions bottom ring 40 at a user's neck region where it encircles the neck. An air passage 42 is provided through bottom ring 40. In general, air passage 42 provides fluid communication between an ambient air environment and interior region 35 of sleeve 30 at open end 32 thereof. The location of air passage 42 in bottom ring 40 is not a limitation of the present invention. Disposed in air passage 42 is a check valve 43 configured such that air can only flow through passage 42 and into interior region 35, but no air can exit interior region 35 through air passage 42. In this way, a supply of fresh or filtered air under pressure coupled to air passage 42 can serve as the source of air being supplied to the interior region 35 of sleeve 30. Such fresh or filtered air can originate from a portable filtered-air source or could by supplied via a conduit (not shown) receiving fresh outdoor air. For example, a user could couple a portable filtered-air pump to passage 42 whenever the user did not have access to an aircraft's filtered-air nozzle. In this way, a user can safely move about an aircraft's cabin, airport, etc. In other scenarios, fresh outdoor air could be collected from outside a moving vehicle and provided to air passage 42 where the vehicle movement creates the supply of pressurized air needed to open check valve 43. Some embodiments of the present invention can include notches 44 in the left and/or right interior sides of central opening 41 to provide a lead in for the flexible conduits (not shown) used to couple to an oxygen generator to a nasal cannula.

Figure 6:
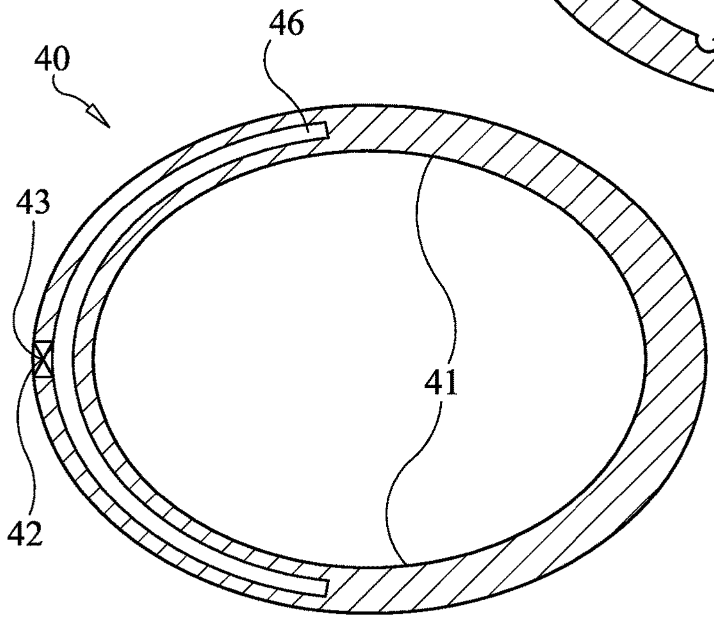
FIG. 6 is a cross-sectional view of the system's bottom ring having a manifold included therein in accordance with another embodiment of the present invention.
Figure 7:
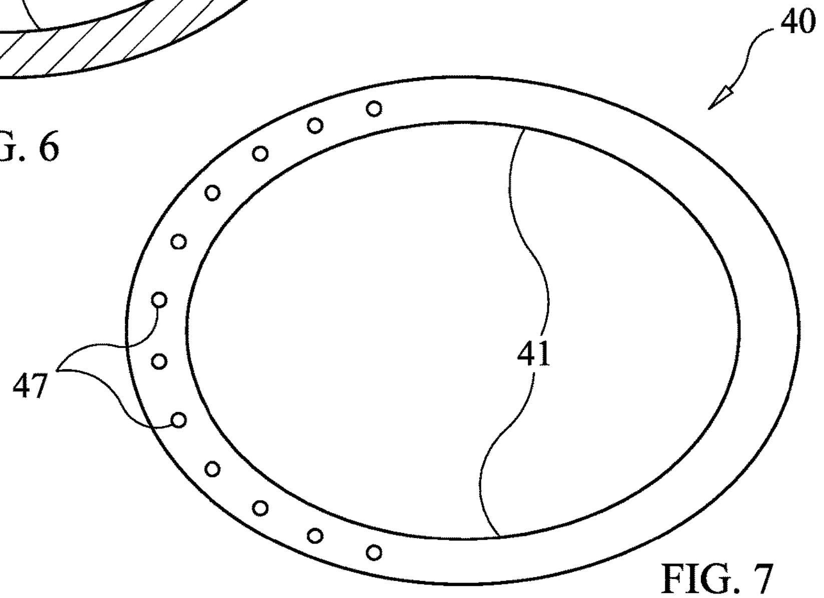
FIG. 7 is a top plan view of the system's bottom ring when the bottom ring has a manifold included therein.

In some embodiments of the present invention, bottom ring 40 can be configured with a manifold and vents similar to those provided in top ring 20. For example and with reference to FIGS. 6 and 7, bottom ring 40 can include a manifold in fluid communication with air passage 42 via check valve 43 (FIG. 6), and can include vents 47 (FIG. 7) that are in fluid communication with manifold 46 and the interior region 35 of sleeve 30.

Figure 8:
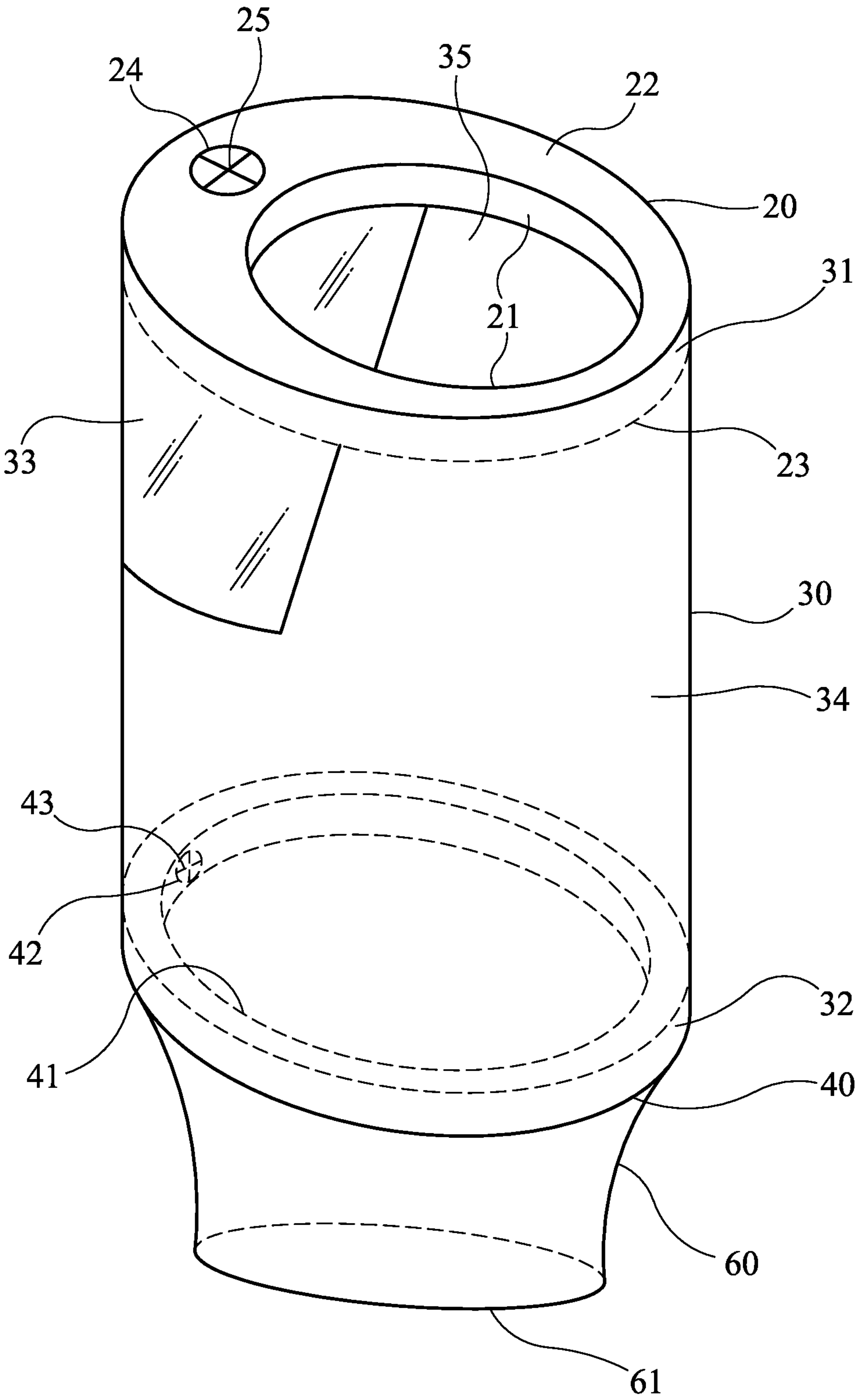
FIG. 8 is a perspective view of a personal protected-air system further including an air-filtering neck ring in accordance with another embodiment of the present invention.

In some embodiments of the present invention, an additional "ring" of flexible material can be included with or coupled to bottom ring 40 in order to provide a comfortable and circumscribing engagement with a user's neck. For example and as illustrated in FIG. 8, a ring 60 of flexible material is coupled to or integrated with bottom ring 40. Ring 60 includes an elasticized outboard opening 61 that can expand/stretch over one's head, and then contract/relax to conform to a user's neck. Ring 60 can be made from an air filtering material. In this way, a user's exhaled breath will be filtered as it exits system 10 through ring 60 before entering the ambient air environment thereby protecting other individuals from potential infectious pathogens container in the user's exhaled breath.

Figure 9:
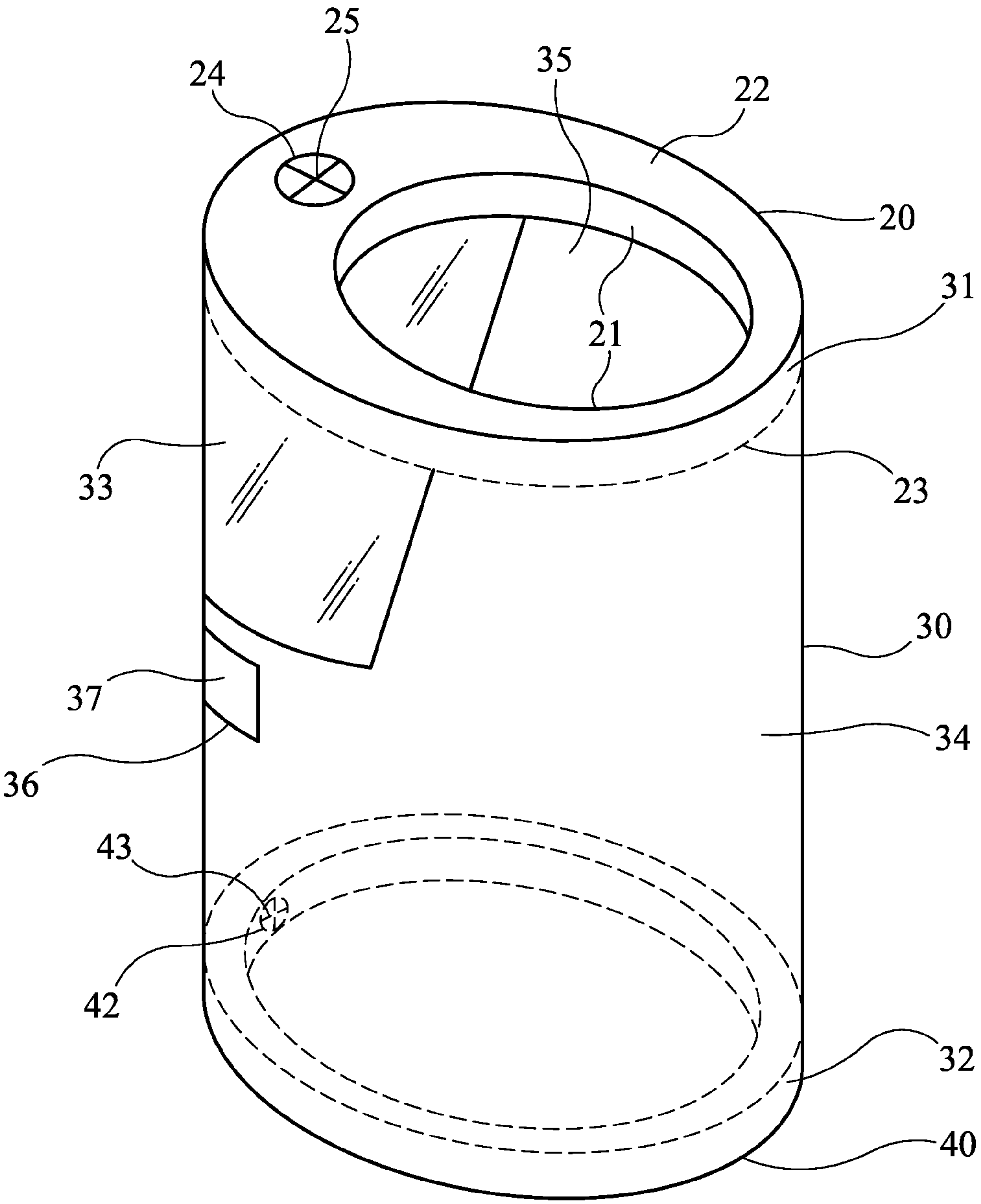
FIG. 9 is a perspective view of a personal protected-air system further including a nutrition receiving port in accordance with another embodiment of the present invention.

In some embodiments of the present invention, the protected-air system's sleeve 30 can be provided with a sealable aperture that a user can access/open to pass a straw or eating utensil through without removing the protected-air system. For example and as illustrated in FIG. 9, sleeve 30 can have an aperture 36 that will be located near a user's mouth when they are wearing the protected-air system. Aperture 36 is sealed by a door 37 that can be constructed in a variety of ways (e.g., integrated with sleeve 30, attached to sleeve 30, etc.) without departing from the scope of the present invention.

Figure 10:
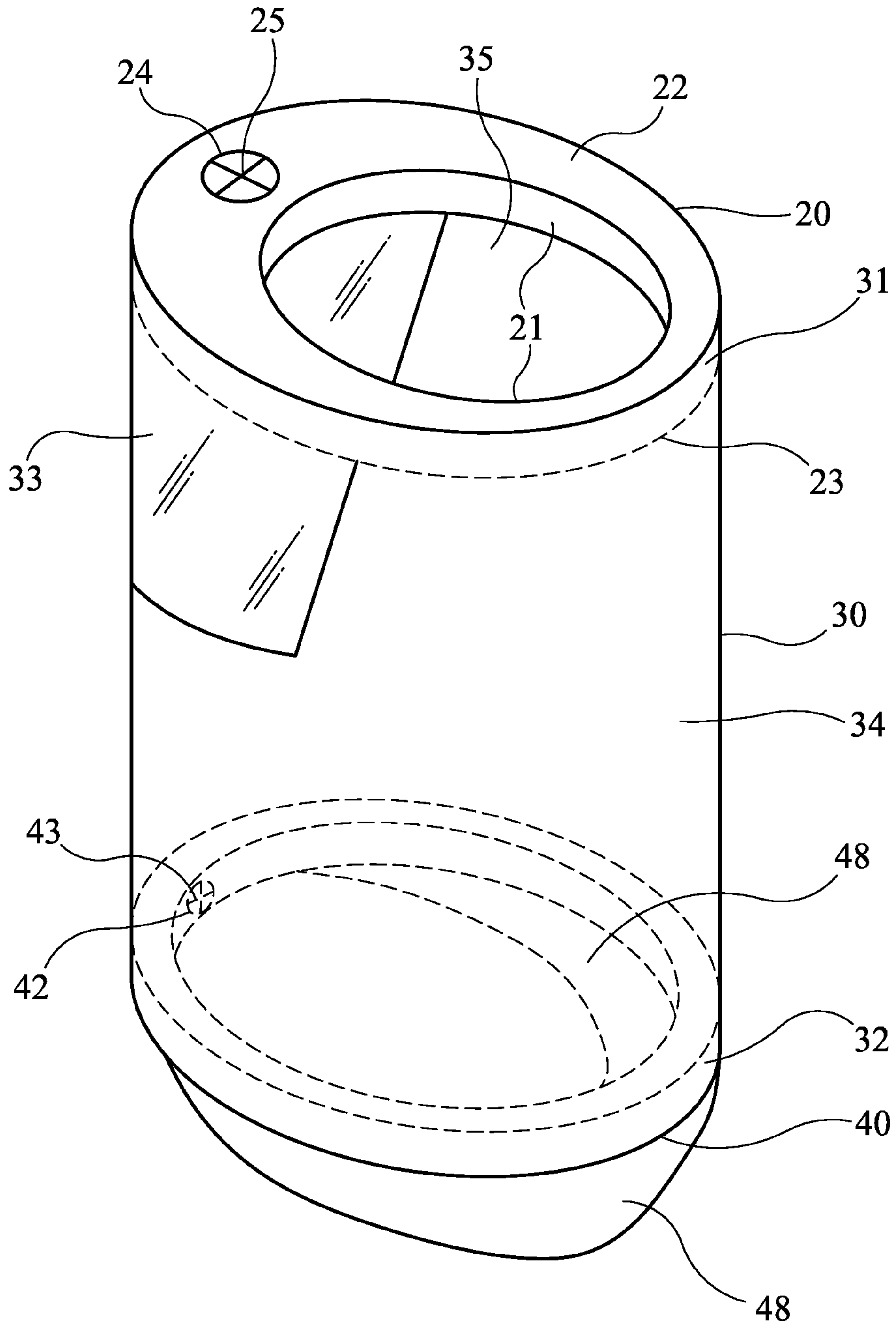
FIG. 10 is a perspective view of a personal protected-air system further including a neck cushion in accordance with another embodiment of the present invention.

In some embodiments of the present invention, the protected-air system's bottom ring 40 can include a cushion such that the bottom ring also serves as a neck pillow. For example and as illustrated in FIG. 10, bottom ring 40 includes a cushioned region 48 that will partially encircle a user's neck when one wears the protected-air system. Cushioned region 48 will allow the user to support their head in a comfortable position while seated in an aircraft seat or land vehicle seat.

It is to be understood that any combination of the features described herein could be incorporated into a personal protected-air system without departing from the scope of the present invention. The selected features that are to be combined can be made to satisfy one or more application-specific criteria.

The advantages of the present invention are numerous. A user can safely enclose and protect his/her breathing space in a comfortable fashion. The personal protected-air system is ideally suited for aircraft and land vehicle travel, as well as when the user must ambulate onboard an aircraft and/or through crowded airports, train stations, and bus depots. The system can be configured in a variety of ways to support a myriad of application criteria, price points, etc.

Although the invention has been described relative to specific embodiments thereof, there are numerous variations and modifications that will be readily apparent to those skilled in the art in light of the above teachings. For example, in embodiments that include manifolds in the top and bottom rings, the manifolds could be placed in fluid communication with one another such that fresh/filtered air can be supplied to either the top or bottom ring for distribution into the sleeve's interior region from both the top and bottom rings. In other embodiments of the present invention, the top and bottom rings could be mechanically coupled to one another in a way that allows the spacing between the top and bottom rings to be adjusted by the user. It is therefore to be understood that, within the scope of the appended claims, the invention may be practiced other than as specifically described.

What is claimed as new and desired to be secured by Letters Patent of the United States is:

1. A personal protected-air system, comprising:

a first ring adapted to rest on and circumscribe a top region of a user's head, said first ring including a first manifold having a first chamber accessible via a first check valve and a plurality of first vents, said first check valve accessible from a first external region of said first ring and said first vents accessible from a second external region of said first ring, said first vents being distributed about a portion of said first ring, wherein said first check valve only permits fluid flow into said first chamber;

an open-ended sleeve having a first open end and a second open end, said sleeve being coupled to said first ring at said first open end thereof wherein said second external region of said first ring is disposed within an interior region of said sleeve, said sleeve including a transparent region, said sleeve adapted to encase the user's head when said first ring rests thereon;

a second ring coupled to said second open end of said sleeve, said second ring adapted to fit over the user's head, said second ring including a second manifold having a second chamber accessible via a second check valve and a plurality of second vents, said second check valve adapted to be accessible from an ambient environment and said second vents accessible from said interior region of said sleeve, wherein said second check valve only permits fluid flow into said second chamber, and wherein one of said first check valve and said second check valve is adapted to receive air under pressure; and a third ring of flexible filter material coupled to said second ring and having an elasticized opening.

2. A personal protected-air system as in claim 1, further comprising a conduit for coupling to said first check valve and adapted to be coupled to an aircraft's filtered-air nozzle that provides the air under pressure, wherein the air under pressure exiting the filtered-air nozzle is introduced into said interior region of said sleeve via successive movement through said conduit, said first check valve, said first chamber, and said first vents.

3. A personal protected-air system as in claim 1 wherein, when said first ring rests on the user's head, said first external region is at a top surface of said first ring and said second external region is at a bottom surface of said first ring.

4. A personal protected-air system as in claim 1 wherein, when said first ring rests on the user's head, said portion of said first ring is adapted to extend along front and side portions of the user's head.

5. A personal protected-air system as in claim 1, wherein said sleeve is removably coupled to said first ring and said second ring.

6. A personal protected-air system as in claim 1 wherein, when said first ring rests on the user's head, said second ring is adapted to circumscribe the user's neck, said second ring including a cushion adapted to partially encircle the user's neck.

7. A personal protected-air system as in claim 1, further comprising a sealable aperture disposed in said sleeve and adapted to be positioned near the user's mouth when said first ring rests on the user's head.

* * * * *